(12) United States Patent
Park et al.

(10) Patent No.: US 11,743,830 B2
(45) Date of Patent: Aug. 29, 2023

(54) PANEL ACTIVATION AT A USER EQUIPMENT

(71) Applicant: NOKIA TECHNOLOGIES OY, Espoo (FI)

(72) Inventors: Kyoungmin Park, Yong-in (KR); Pasi Eino Tapio Kinnunen, Oulu (FI); Frederick Vook, Schaumburg, IL (US)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 16/543,329

(22) Filed: Aug. 16, 2019

(65) Prior Publication Data

US 2021/0051593 A1    Feb. 18, 2021

(51) Int. Cl.

| | |
|---|---|
| *H04W 52/02* | (2009.01) |
| *H04W 56/00* | (2009.01) |
| *H04W 76/27* | (2018.01) |
| *H04L 1/00* | (2006.01) |
| *H04L 5/00* | (2006.01) |
| *H04W 72/044* | (2023.01) |
| *H04W 74/08* | (2009.01) |

(52) U.S. Cl.
CPC ....... *H04W 52/0274* (2013.01); *H04L 1/0026* (2013.01); *H04L 5/0051* (2013.01); *H04W 56/001* (2013.01); *H04W 72/046* (2013.01); *H04W 74/0833* (2013.01); *H04W 76/27* (2018.02)

(58) Field of Classification Search
CPC ............. H04W 52/0274; H04W 76/27; H04W 56/001; H04W 72/046; H04W 74/0833; H04L 1/0026; H04L 5/0051

USPC .......................................................... 370/329
See application file for complete search history.

(56) References Cited

U.S. PATENT DOCUMENTS

| | | | |
|---|---|---|---|
| 2018/0368189 A1* | 12/2018 | Narasimha | H04W 56/001 |
| 2019/0306850 A1* | 10/2019 | Zhang | H04B 7/0639 |
| 2020/0008188 A1* | 1/2020 | Nam | H04W 72/0446 |
| 2020/0008247 A1* | 1/2020 | Kwak | H04B 7/0695 |
| 2020/0351945 A1* | 11/2020 | Chande | H04W 16/28 |
| 2020/0351950 A1* | 11/2020 | Liu | H04W 72/53 |
| 2020/0383141 A1* | 12/2020 | Lei | H04W 56/001 |

(Continued)

*Primary Examiner* — Faisal Choudhury
(74) *Attorney, Agent, or Firm* — Brake Hughes Bellermann LLP (57) ABSTRACT

An example method, apparatus, and computer-readable storage medium are provided for panel activation at a user equipment. In an example implementation, the method may include a user equipment (UE) receiving a synchronization signal block (SSB) from a network node; receiving a panel activation request from the network node; measuring a plurality of beams received from the network node; activating one or more panels, the activating based at least on the panel activation request and/or the measuring; and transmitting, by the user equipment (UE): a first transmission of a physical random access channel (PRACH) using a first physical random access channel (PRACH) resource, a second transmission of the physical random access channel (PRACH) using a second physical random access channel (PRACH) resource configured for indicating the activating of one or more panels at the user equipment (UE), and wherein the first transmission and the second transmission are transmitted using a same transmit (Tx) beam from the user equipment (UE).

24 Claims, 8 Drawing Sheets

(56) References Cited

U.S. PATENT DOCUMENTS

2021/0050666 A1\* 2/2021 Cirik ................ H04W 76/38
2021/0168714 A1\* 6/2021 Guan ................ H04B 7/0404
2021/0258811 A1\* 8/2021 Zhang ............... H04B 7/0691

\* cited by examiner

PANEL ACTIVATION AT A USER EQUIPMENT

TECHNICAL FIELD

This description relates to wireless communications, and in particular, to panel activation at a user equipment (UE).

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

An example method, apparatus, and computer-readable storage medium are provided for panel activation at a user equipment.

In an example implementation, the method may include receiving, by a user equipment (UE), a synchronization signal block (SSB) from a network node, the synchronization signal block (SSB) comprising a plurality of beams; receiving, by the user equipment (UE), a panel activation request from the network node; measuring, by the user equipment (UE), the plurality of beams received from the network node; activating, by the user equipment (UE), one or more panels, the activating based at least on the panel activation request and/or the measuring; and transmitting, by the user equipment (UE): a first transmission of a physical random access channel (PRACH) using a first physical random access channel (PRACH) resource of a first set of physical random access channel (PRACH) resources configured for the plurality of the beams associated with the SSB, a second transmission of the physical random access channel (PRACH) using a second physical random access channel (PRACH) resource of a second set of physical random access channel (PRACH) resources configured for indicating the activating of one or more panels at the user equipment (UE), and wherein the first transmission and the second transmission are transmitted using a same transmit (Tx) beam from the user equipment (UE).

In an additional example implementation, the method may include receiving, by a user equipment (UE), a synchronization signal block (SSB) from a network node, the synchronization signal block (SSB) comprising a plurality of beams; measuring, by the user equipment (UE), the plurality of beams received from the network node; receiving, by the user equipment (UE), configuration information from the network node, the configuration information based on SSB configuration and a number of panels at the user equipment (UE), the configuration information further comprising: a first transmission configuration indicating a first set of physical random access channel (PRACH) resources configured for the plurality of beams received from the network node, and a second transmission configuration indicating a second set of physical random access channel (PRACH) resources for one or more panels active at the user equipment (UE); and transmitting, by the user equipment (UE): a first transmission of a physical random access channel (PRACH) to the network node, the first transmission using resources based on the first transmission configuration, and a second transmission of the physical random access channel (PRACH) to the network node, the second transmission using resources based on the second transmission configuration.

DETAILED DESCRIPTION

Figure 1:
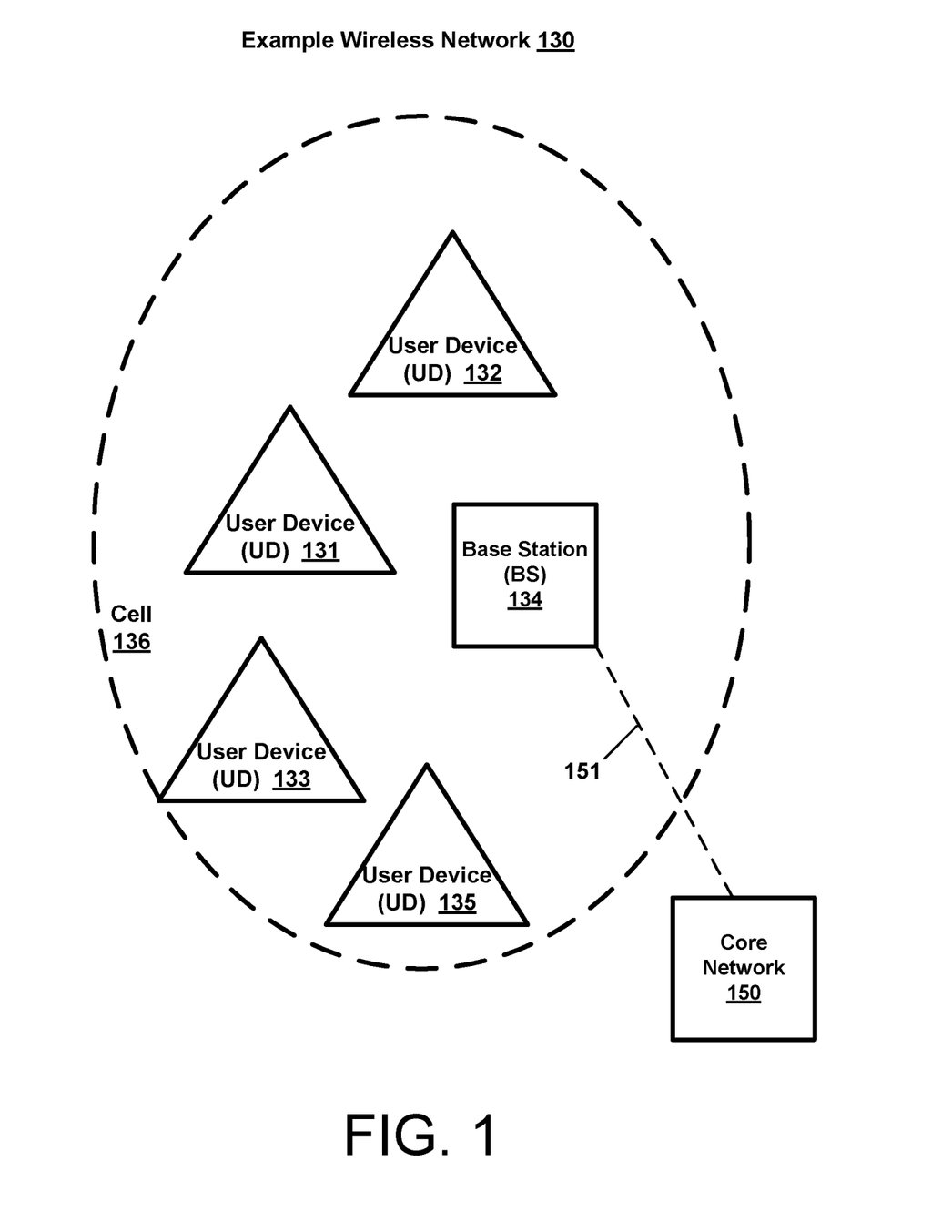
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next generation Node B (gNB), a network node, or a radio access network node. At least part of the functionalities of an access point (AP), base station (BS), (e) Node B (eNB), or gNB may also be carried out by any node, server or host which may be operably coupled to a transceiver, such as a remote radio head or an integrated access and backhaul (IAB) node. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. In case of an IAB node, a donor node is connected to core network 150 via a core network interface and may include a distributed unit (DU) and centralized unit (CU). This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network. A user device may also include an IAB node where UE operations are used in user plane and control plane level. A unit corresponding to a user equipment (UE) at integrated access and backhaul (IAB) node is called mobile termination (MT) unit. The mobile termination unit communicates in case of an IAB node with the base station which is called IAB donor node.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples. Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

The activation of panels at a user equipment (UE) can be triggered by the UE or a network node, e.g., gNB. However, 3GPP Specifications do not currently specify the details related to the activation of panels at the UE. For instance, 3GPP Specifications do not specify the signaling related to how the gNB requests panel activation, how the UE informs the gNB about panel activation, etc. This applies to activation of panels in both intra-transmission reception point (intra-TRP) and inter-TRP scenarios. Therefore, there is a need/desire for a signaling mechanism for activation of panels at a UE.

The proposed disclosure describes mechanisms/procedures for configuration of resources and activation of panels at a UE.

In an example implementation, the method may include receiving, by a user equipment (UE), a synchronization signal block (SSB) from a network node, the synchronization signal block (SSB) comprising a plurality of beams; receiving, by the user equipment (UE), a panel activation request from the network node; measuring, by the user equipment (UE), the plurality of beams received from the network node; activating, by the user equipment (UE), one or more panels, the activating based at least on the panel activation request and/or the measuring; and transmitting, by the user equipment (UE): a first transmission of a physical random access channel (PRACH) using a first physical random access channel (PRACH) resource of a first set of physical random access channel (PRACH) resources configured for the plurality of the beams associated with the SSB, a second transmission of the physical random access channel (PRACH) using a second physical random access channel (PRACH) resource of a second set of physical random access channel (PRACH) resources configured for indicating the activating of one or more panels at the user equipment (UE), and wherein the first transmission and the second transmission are transmitted using a same transmit (Tx) beam from the user equipment (UE).

In an additional example implementation, the method may include receiving, by a user equipment (UE), a synchronization signal block (SSB) from a network node, the synchronization signal block (SSB) comprising a plurality of beams; measuring, by the user equipment (UE), the plurality of beams received from the network node; receiving, by the user equipment (UE), configuration information from the network node, the configuration information based on SSB configuration and a number of panels at the user equipment (UE), the configuration information further comprising: a first transmission configuration indicating a first set of physical random access channel (PRACH) resources configured for the plurality of beams received from the network node, and a second transmission configuration indicating a second set of physical random access channel (PRACH) resources for one or more panels active at the user equipment (UE); and transmitting, by the user equipment (UE): a first transmission of a physical random access channel (PRACH) to the network node, the first transmission using resources based on the first transmission configuration, and a second transmission of the physical random access channel (PRACH) to the network node, the second transmission using resources based on the second transmission configuration.

Figure 2:
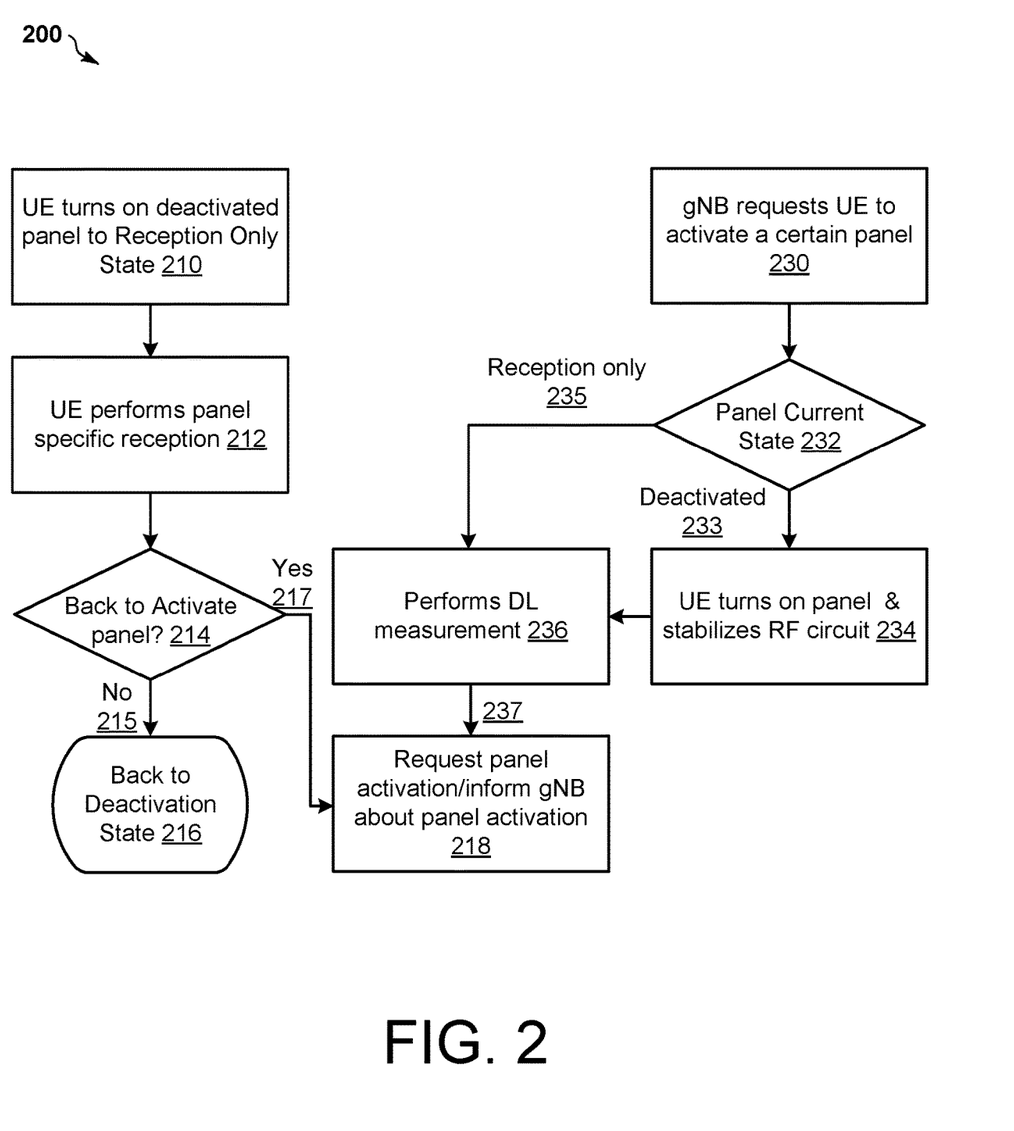
FIG. 2 illustrates an example panel activation process at a user equipment, according to an example implementation.

FIG. 2 illustrates an example panel activation process 200 at a user equipment, according to an example implementation.

In some implementations, for example, a plurality of state (e.g., three different states) may be defined for a panel at a UE—a deactivated state, a reception only state, and an activated state. In a deactivated state, the panel is turned off for power savings and a delay may be introduced for the UE to use the panel due to time needed to activate the panel. In a reception only state, a panel may be used for downlink reception and/or downlink measurement. But, to use the panel in the reception only state for uplink transmission, additional operations such as uplink beam alignment may be needed. In an activated state, a panel may be ready for downlink reception/measurement and/or uplink transmission.

In an example implementation, for example, at 210, a panel at a UE (for example, UE/user device of FIG. 1) may be in a deactivated state and the UE may transition (e.g., turns on) the panel to a reception only state. In the reception only state, the UE, as described above, may use the panel for downlink reception and/or measurements.

At 212, the UE may perform a panel specific reception. In some implementations, for example, if the UE is configured with a plurality of panels, e.g., two panels, panel 1 and panel 2, the UE may perform a panel specific reception using, for example, panel 1.

At 214, the UE may determine whether to activate a panel.

At 216, the UE may transition the panel to the deactivated state 216 upon determining, at 215, that there is no need to activate the panel.

Alternatively, at 218, the UE may activate and transition the panel to an activated state upon determining, at 217, that the panel needs to be activated. Once UE activates the panel, the UE has to inform the radio access network node (e.g., gNB) that the panel has been activated so that the gNB is aware of the activated panel (e.g., gNB may utilize the activated panel for uplink transmissions). The signaling mechanism needed to inform the gNB that a panel is activated at a UE is described in detail in reference to FIGS. 3-6.

In another example implementation, at 230, a gNB (for example, BS of FIG. 1) may request a UE to activate one or more panels at the UE. In some implementations, for example, the gNB may indicate identities of one or more panels to be activated at UE or a number of panels to be activated at the user equipment (UE).

At 232, the UE determines the current state of the panel based on the request received from the gNB at 230.

At 234, the UE, upon determining that the panel is in a deactivated state at 233, turns on the panel. In one example implementation, at 234, the UE may transition the panel to reception only state.

At 236, the UE perform downlink measurement of a downlink signal transmitted by the gNB.

At 218, the UE may activate the panel and transition the panel to an activated state. Once UE activates the panel, the UE has to inform the radio access network node (e.g., gNB) that the panel has been activated so that the gNB is aware of the activated panel. The signaling mechanism needed to inform the gNB that a panel is activated at a UE is described in detail in reference to FIGS. 3-6.

It should be noted that the panel activation process may be triggered by a UE or a gNB. The signaling details on how the UE requests/informs the panel activation, how the gNB requests UE to activate a certain panel are described below in detail. In addition, as panel activation can happen in different scenarios, for example, intra-TRP panel activation and inter-TRP panel activation, the proposed disclosure addresses both these scenarios.

Figure 3A:
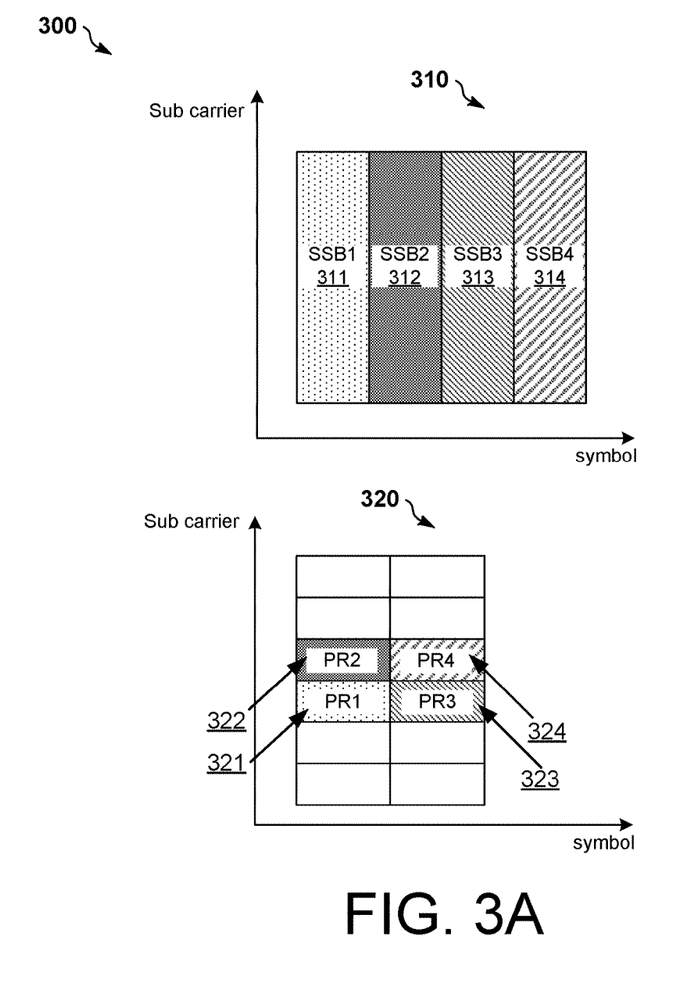
FIG. 3 illustrates an example PRACH resource configuration for panel activation at a user equipment, according to an example implementation.
Figure 3B:
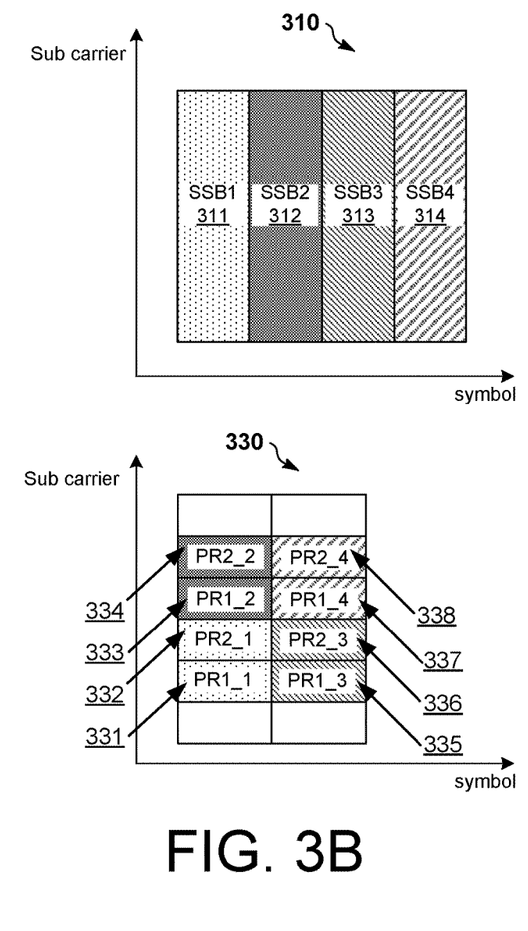

FIG. 3 illustrates an example PRACH resource configuration 300 for panel activation at a user equipment, according to an example implementation.

In an example implementation, 310 of FIG. 3 illustrates a gNB (for example, BS of FIG. 1) transmitting a synchronization signal block (SSB), which may include a plurality of beams, to a UE (for example, UE/user device of FIG. 1). For example, FIG. 3 illustrates the gNB transmitting SSBs/beams SSB1 (311), SSB2 (312), SSB3 (313), and SSB4 (314) to the UE. Upon receiving the SSBs/beams from the gNB, the UE may transmit a physical random access channel (PRACH) using PRACH resources PR1 (321), PR2 (322), PR3 (323), and PR4 (324) corresponding to SSBs/beams 311, 312, 313, and 313, respectively, as shown in FIG. 3.

In some implementations, the UE may be configured with multiple panels, for example, two panels, and additional signaling may be needed between the UE and the gNB so that the gNB is aware of specific panels being activated at the UE and/or instruct the UE to activate specific panels or a number of a panels at the UE.

In some implementations, for example, when the UE is configured with two panels, panels 1 and 2, the UE may transmit the PRACH using at least a resource for each panel and for each beam received from the gNB. For example, the UE may use PRACH resources PR1_1 (331) and PR2_1 (332) for panels 1 and 2 of SSB1, PR1_2 (333) and PR2_2 (334) for panels 1 and 2 of SSB2, PR1_3 (335) and PR2_3 (336) for panels 1 and 2 of SSB3, and PR1_4 (337) and PR2_4 (338) for panels 1 and 2 of SSB4 for transmitting the PRACH to the gNB. The PRACH resources used by the UE for transmitting the PRACH resource notify the gNB of the specific panels being activated. In addition, the PRACH resources that are required at the UE for transmission of the PRACH may be based on configuration information received from the gNB.

The above described mechanism uses additional PRACH resources to support the signaling mechanism between the UE and gNB.

Figure 4:
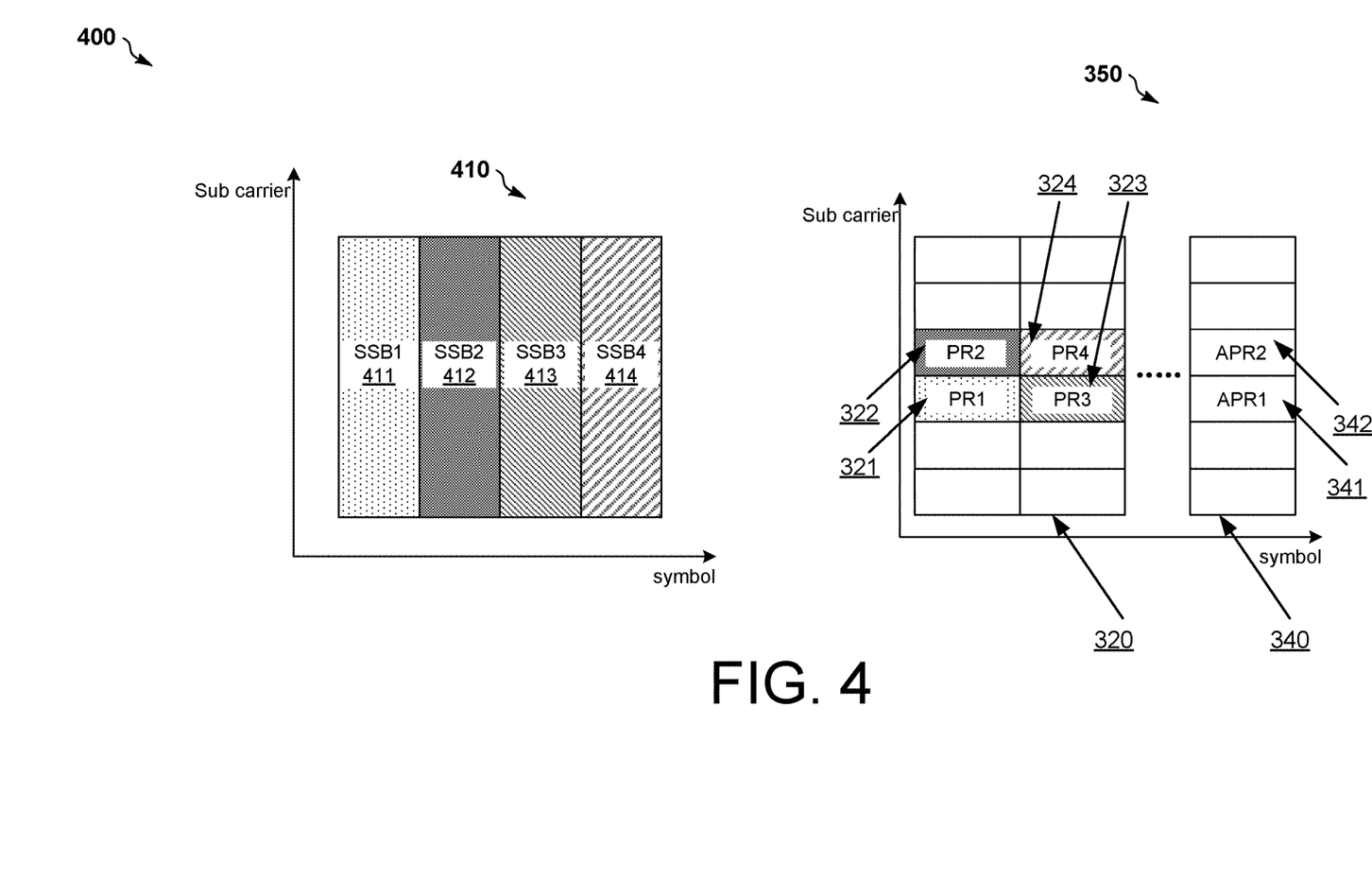
FIG. 4 illustrates an example PRACH resource configuration for panel activation at a user equipment, according to an example implementation.

FIG. 4 illustrates an example PRACH resource configuration 300 for panel activation at a user equipment, according to an example implementation.

In an example implementation, similar to 310 of FIG. 3, 410 of FIG. 4 illustrates a gNB (for example, BS of FIG. 1) transmitting a synchronization signal block (SSB), which may include a plurality of beams, to a UE (for example, UE/user device of FIG. 1). For example, FIG. 4 illustrates the gNB transmitting SSBs/beams SSB1 (311), SSB2 (312), SSB3 (313), and SSB4 (314) to the UE. Upon receiving the SSBs/beams from the gNB, the UE may transmit a physical random access channel (PRACH) using PRACH resources PR1 (321), PR2 (322), PR3 (323), and PR4 (324) corresponding to SSBs/beams 311, 312, 313, and 313, respectively, as shown in FIG. 3.

In some implementations, for example, when the UE is configured with two panels, panels 1 and 2 (as described above in reference to FIG. 3), the UE may signal the gNB of the specific panels activated at the UE by an additional uplink transmission using an additional physical resource, for example, by using an additional PRACH transmission using PRACH resources (e.g., 341, 342, etc.) configured at the UE. For instance, PRACH resources APR1 (341) and APR2 (342) are configured for notifying the gNB about the specific panels being activated at the UE.

For example, the UE may be configured with one additional PRACH resource per panel, APR1 (341) for panel 1 and APR2 (342) for panel 2. In some implementations, for example, the UE may send PRACH via legacy or panel common PRACH resources, e.g., PRACH resources (e.g., 321, 322, 323, and 324) followed by panel specific PRACH resources (e.g., 341, 342, etc.). For panel specific PRACH resources, any linkage of beam is not configured, and the UE may use the same transmit (Tx) beam for the common PRACH resource and the panel specific PRACH resource. In other words, for the panel specific PRACH resource, the UE may use the same beam that is used for the recent PRACH transmission.

The above described mechanism uses an additional transmission of PRACH but uses less resources when compared to the mechanism described above in reference to FIG. 3. The above two mechanisms described above have their own advantages and provides a signaling mechanism between the UE and gNB for panel activations at the UE.

Figure 5:
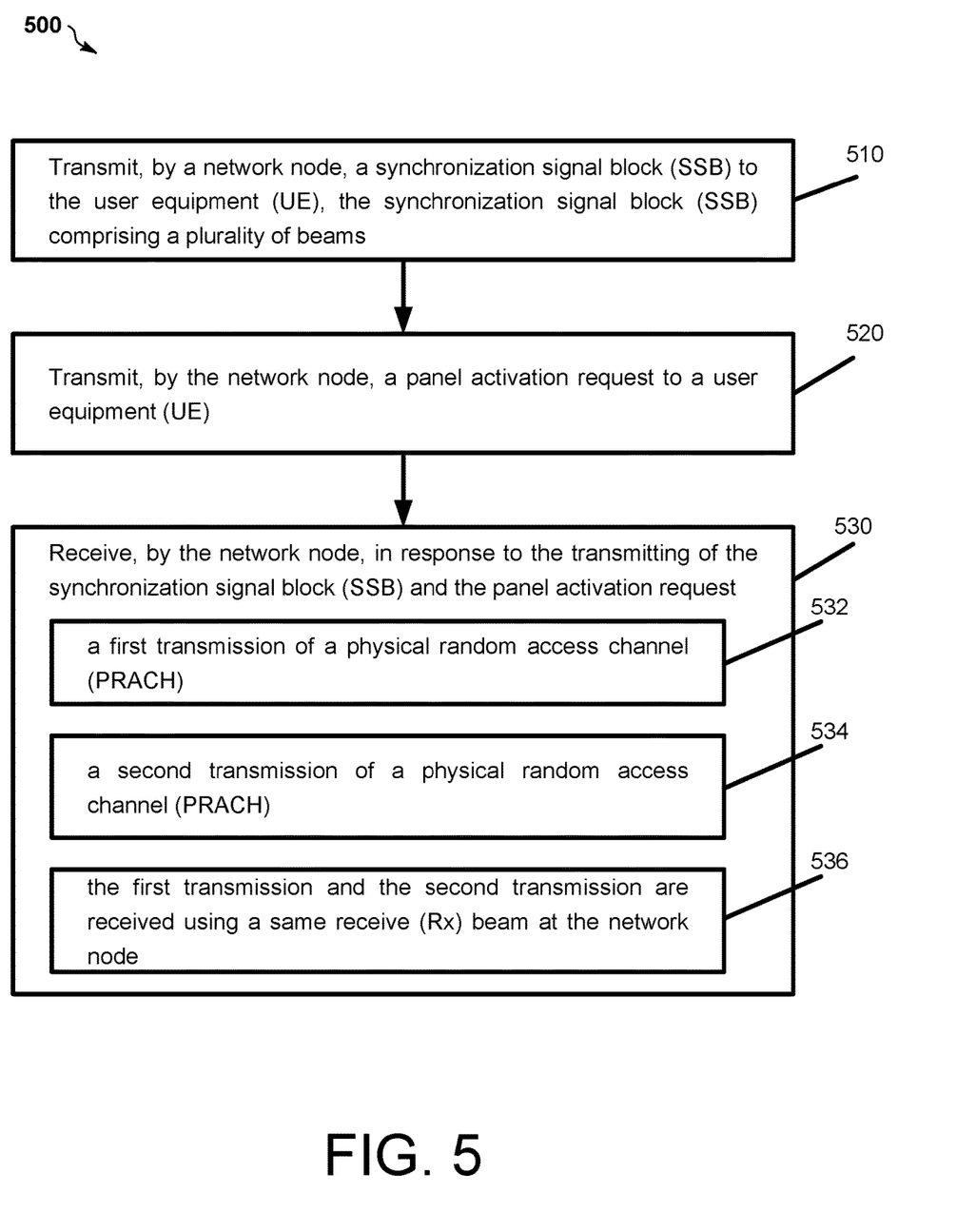
FIG. 5 is a flow chart illustrating an example panel activation mechanism, according to at least one example implementation.

FIG. 5 is a flow chart 500 illustrating an example panel activation mechanism 500, according to at least one example implementation.

At block 510, a network node (e.g., a gNB or BS of FIG. 1) may transmit a synchronization signal block (SSB) to the user equipment (UE). In some implementations, for example, the network node may transmit an SSB 310 which may comprise a plurality of beams, e.g., 311, 312, 313, and 314.

At block 520, the network node may transmit a panel activation request to a user equipment (UE). In some implementations, for example, the panel activation request may indicate identities of the one or more panels (e.g., panel 1 and/or panel 2) to be activated at the UE or a number of panels (e.g., one or two panels) to be activated at the UE.

At block 530, the network node may receive, in response to the transmitting of the synchronization signal block (SSB) and the panel activation request a first transmission of a PRACH and a second transmission of the PRACH.

In an example implementation, the first transmission of a PRACH may use a first PRACH resource of a first set of PRACH resources, the first set of PRACH resources configured for the plurality of the beams associated with the SSB; the second transmission of the PRACH may use a second PRACH resource of a second set of PRACH resources, the second transmission comprising a panel activation message and the second set of PRACH resources configured for indicating one or more panels activated at the user equipment (UE); and wherein the first transmission and the second transmission may be received using a same receive (Rx) beam at the network node.

In some implementations, for example, the panel activation request may be transmitted by the network node to the UE via a physical downlink control channel (PDCCH), a radio resource control (RRC) configuration message, and/or a channel state information-reference signal (CSI-RS).

Additional example implementations are described herein.

Example 1. A method of communications, comprising: transmitting, by a network node, a synchronization signal block (SSB) to the user equipment (UE), the synchronization signal block (SSB) comprising a plurality of beams; transmitting, by the network node, a panel activation request to a user equipment (UE); and receiving, by the network node, in response to the transmitting of the synchronization signal block (SSB) and the panel activation request: a first transmission of a physical random access channel (PRACH) using a first physical random access channel (PRACH) resource of a first set of physical random access channel (PRACH) resources, the first set of physical random access channel (PRACH) resources configured for the plurality of the beams associated with the SSB, a second transmission of the physical random access channel (PRACH) using a second physical random access channel (PRACH) resource of a second set of physical random access channel (PRACH) resources, the second transmission comprising a panel activation message and the second set of physical random access channel (PRACH) resources configured for indicating one or more panels activated at the user equipment (UE), and wherein the first transmission and the second transmission are received using a same receive (Rx) beam at the network node.

Example 2. The method of Example 1, wherein the panel activation request indicates: identities of the one or more panels to be activated at the user equipment (UE), or a number of panels to be activated at the user equipment (UE).

Example 3. The method of any of Examples 1-2, wherein the panel activation request is transmitted via a physical downlink control channel (PDCCH), a radio resource control (RRC) configuration message, or a channel state information-reference signal (CSI-RS).

Example 4. The method of any of Examples 1-3, wherein the network node is a radio access network node, an integrated access and backhaul (IAB) network node, and/or the user equipment (UE) is an integrated access and backhaul (IAB) node.

Example 5. An apparatus comprising at least one processor and at least one memory including computer instructions, when executed by the at least one processor, cause the apparatus to perform a method of any of Examples 1-4.

Example 6. An apparatus comprising means for performing the method of any of Examples 1-4.

Example 7. A non-transitory computer-readable storage medium having stored thereon computer executable program code which, when executed on a computer system, causes the computer system to perform the steps of any of Examples 1-4.

Figure 6:
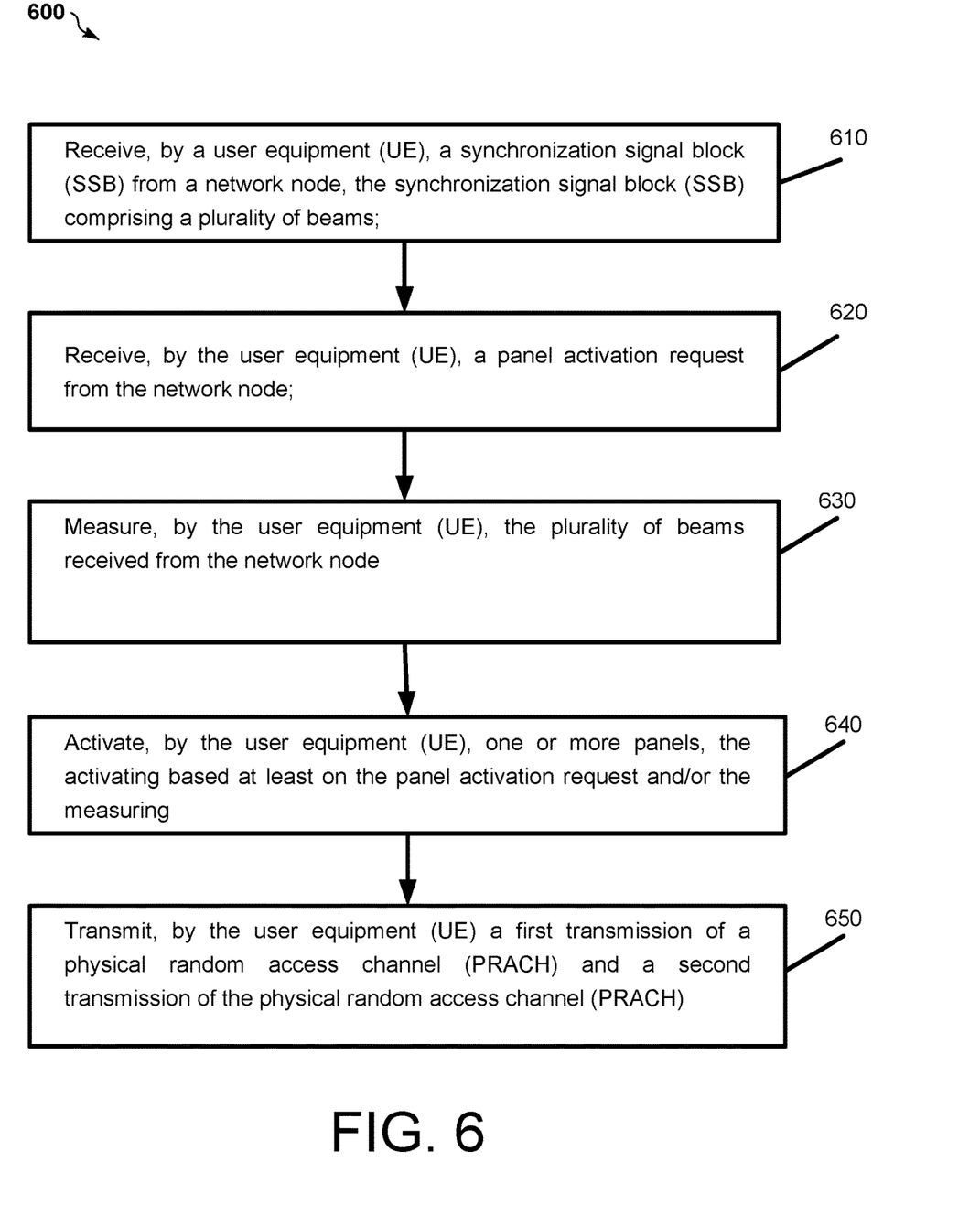
FIG. 6 is a flow chart illustrating another example panel activation mechanism, according to at least one additional example implementation.

FIG. 6 is a flow chart illustrating another example panel activation mechanism 600, according to at least one additional example implementation.

At block 610, a user equipment, UE (e.g., UE of FIG. 1) may receive an SSB (e.g., SSB 410) from a network node (e.g., gNB), the synchronization signal block (SSB) comprising a plurality of beams (e.g., 411, 412, 413, and 414).

At block 620, the UE may receive a panel activation request from the network node. In some implementations, for example, the panel activation request may indicate identities of the one or more panels (e.g., panel 1 and/or panel 2) to be activated at the UE or a number of panels (e.g., one or two panels) to be activated at the UE.

At block 630, the UE may measure the plurality of beams received from the network node. In some implementations, the UE may measure beams 411, 412, 413, and 414 that are received from the gNB.

At block 640, the UE may activate one or more panels, e.g., panels 1 and/or 2 at the UE. In some implementations, for example, the activation of the panels may be based at least on the panel activation request received from the gNB and/or the measurements.

At block 650, the UE may transmit a first transmission of a PRACH and a second transmission of the PRACH to the gNB. In some implementations, for example, the first transmission of a PRACH may use a first PRACH resource of a first set of PRACH resources configured for the plurality of the beams associated with the SSB; a second transmission of the PRACH using a second PRACH resource of a second set of PRACH resources configured for indicating the activation of one or more panels at the UE; wherein the first transmission and the second transmission are transmitted using a same transmit (Tx) beam from the UE.

In some implementations, for example, the UE may use one or more panels for performing the measurements. The panel used by the UE for performing the measurements may be in a reception only state. However, if the panel to be used for measurements is in a deactivated state, the UE may transition the specific panel to the reception only state for performing the measurements.

In some implementations, for example, as described above, the panel activation request may be received from the gNB via a physical downlink control channel (PDCCH), a radio resource control (RRC) configuration message, or a CSI-RS.

Additional example implementations are described herein.

Example 8. A method of communications, comprising: receiving, by a user equipment (UE), a synchronization signal block (SSB) from a network node, the synchronization signal block (SSB) comprising a plurality of beams; receiving, by the user equipment (UE), a panel activation request from the network node; measuring, by the user equipment (UE), the plurality of beams received from the network node; activating, by the user equipment (UE), one or more panels, the activating based at least on the panel activation request and/or the measuring; and transmitting, by the user equipment (UE): a first transmission of a physical random access channel (PRACH) using a first physical random access channel (PRACH) resource of a first set of physical random access channel (PRACH) resources configured for the plurality of the beams associated with the SSB, a second transmission of the physical random access channel (PRACH) using a second physical random access channel (PRACH) resource of a second set of physical random access channel (PRACH) resources configured for indicating the activating of one or more panels at the user equipment (UE), and wherein the first transmission and the second transmission are transmitted using a same transmit (Tx) beam from the user equipment (UE).

Example 9. The method of Example 8, wherein the panel activation request indicates: identities of the one or more panels to be activated at the user equipment (UE), or a number of panels to be activated at the user equipment (UE).

Example 10. The method of any of Examples 8-9, wherein at least one panel is used by the user equipment (UE) for performing the measuring.

Example 11. The method of any of Examples 8-10, wherein at least one panel that is used by the user equipment (UE) for performing the measuring is in a reception only state.

Example 12. The method of any of Examples 8-11, wherein at least one panel that is used by the user equipment (UE) for performing the measuring is in a deactivated state and transitioned to the reception only state for performing the measuring.

Example 13. The method of any of Examples 8-12, wherein the panel activation request is received via a physical downlink control channel (PDCCH), a radio resource control (RRC) configuration message, or a channel state information-reference signal (CSI-RS).

Example 14. The method of any of Examples 8-13, wherein the network node is a radio access network node or an integrated access and backhaul (IAB) network node.

Example 15. An apparatus comprising at least one processor and at least one memory including computer instructions, when executed by the at least one processor, cause the apparatus to perform a method of any of Examples 8-14.

Example 16. An apparatus comprising means for performing the method of any of Examples 8-14.

Example 17. A non-transitory computer-readable storage medium having stored thereon computer executable program code which, when executed on a computer system, causes the computer system to perform the steps of any of Examples 8-14.

Figure 7:
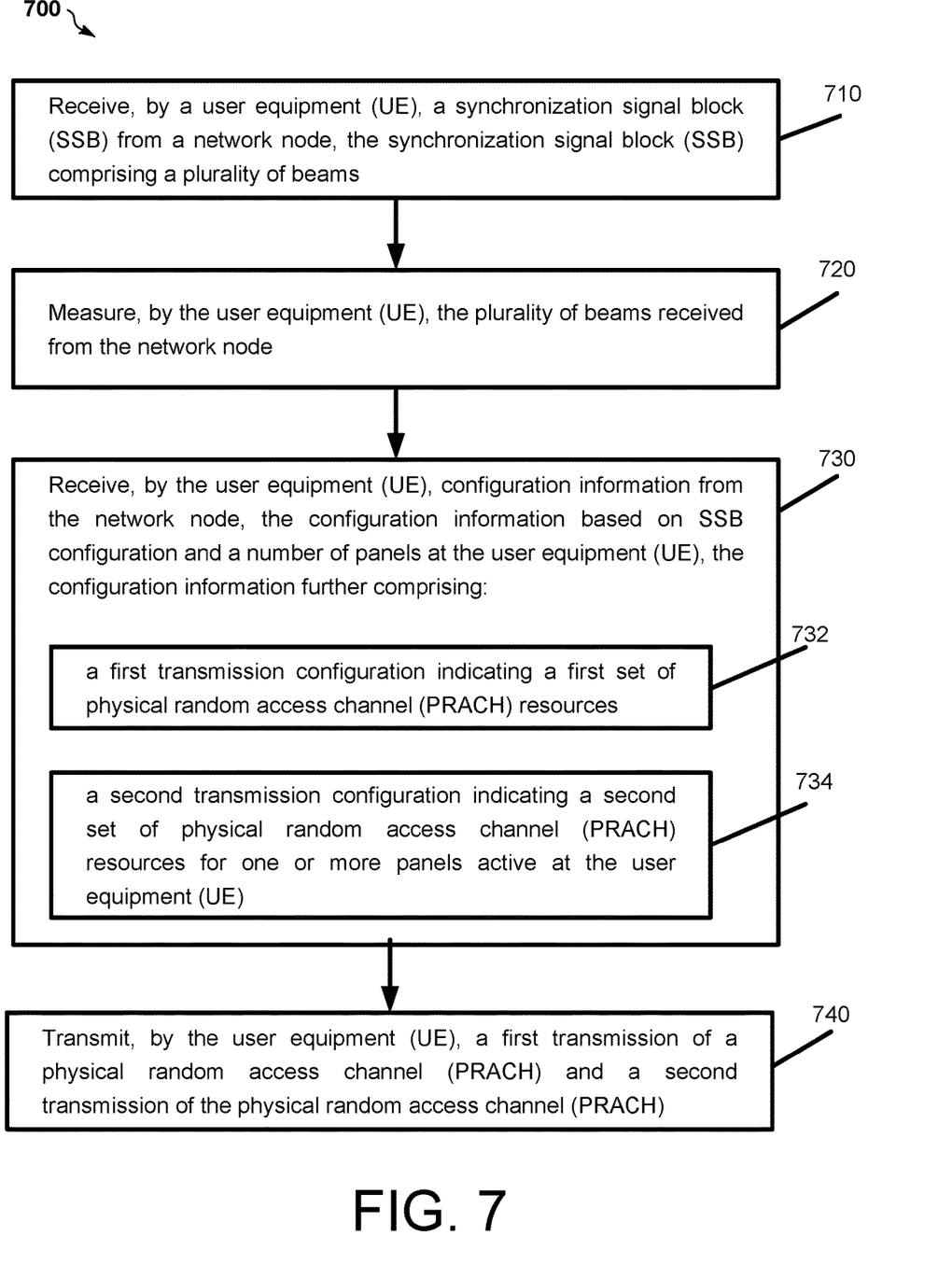
FIG. 7 is a flow chart illustrating another example panel activation mechanism, according to at least one additional example implementation.

FIG. 7 is a flow chart illustrating another example panel activation mechanism 700, according to at least one additional example implementation.

At block 710, a user equipment, UE (e.g., UE of FIG. 1) may receive an SSB (e.g., 410) from a network node (e.g., gNB of FIG. 1). In some implementations, the SSB may comprise a plurality of beams, e.g., 411, 412, 413, and 414.

At block 720, the UE may measure the plurality of beams (e.g., 411, 412, 413, and 414) received from the network node.

At block 730, the UE may receive configuration information from the network node. In some implementations, the configuration information received from the network node (e.g., and based on SSB configuration and a number of panels at the user equipment (UE)) may include a first transmission configuration indicating a first set of PRACH resources (e.g., 321, 322, 323, and 324) configured for the plurality of beams received from the network node, and a second transmission configuration indicating a second set of PRACH resources (e.g., 341 and 342) for one or more panels active at the UE.

At block 740, the UE may transmit a first transmission 320 of a physical random access channel (PRACH) to the network node, the first transmission using resources (e.g., 321, 322, 323, and/or 324) based on the first transmission configuration, and a second transmission (340) of the physical random access channel (PRACH) to the network node, the second transmission using resources (341 and 342).

Additional example implementations are described herein.

Example 18. A method of communications, comprising: receiving, by a user equipment (UE), a synchronization signal block (SSB) from a network node, the synchronization signal block (SSB) comprising a plurality of beams; measuring, by the user equipment (UE), the plurality of beams received from the network node; receiving, by the user equipment (UE), configuration information from the network node, the configuration information based on SSB configuration and a number of panels at the user equipment (UE), the configuration information further comprising: a first transmission configuration indicating a first set of physical random access channel (PRACH) resources configured for the plurality of beams received from the network node, and a second transmission configuration indicating a second set of physical random access channel (PRACH) resources for one or more panels active at the user equipment (UE); and transmitting, by the user equipment (UE): a first transmission of a physical random access channel (PRACH) to the network node, the first transmission using resources based on the first transmission configuration, and a second transmission of the physical random access channel (PRACH) to the network node, the second transmission using resources based on the second transmission configuration.

Example 19. The method of Example 18, wherein the transmitting of the second transmission of the physical random access channel (PRACH) further comprises:
determining whether a panel of the plurality of panels is being activated; and
configuring, in response to determining that the panel is being activated, a resource from the second set of physical random access channel (PRACH) resources based on the second transmission configuration.

Example 20. The method of any of Examples 18-19, wherein the first transmission and the second transmission are transmitted using a same transmit (Tx) beam from the user equipment (UE).

Example 21. The method of any of Examples 18-20, wherein a panel at the user equipment (UE) is in one of a deactivated mode, a reception only mode, or an activated mode.

Example 22. The method of any of Examples 18-21, wherein panel transitions include at least transitioning of a panel from the deactivated mode to the reception only mode and/or from the reception only mode to the activated mode.

Example 23. The method of any of Examples 18-22, wherein a panel is activated by the user equipment (UE) based on downlink signal quality measurements.

Example 24. The method of any of Examples 18-23, wherein the measuring of the plurality of beams is performed by one or more panels at the user equipment (UE) in the reception only mode.

Example 25. The method of any of Examples 18-24, wherein the user equipment (UE) is an integrated access and backhaul (IAB) node.

Example 26. An apparatus comprising at least one processor and at least one memory including computer instructions, when executed by the at least one processor, cause the apparatus to perform a method of any of Examples 18-25.

Example 27. An apparatus comprising means for performing the method of any of Examples 18-25.

Example 28. A non-transitory computer-readable storage medium having stored thereon computer executable program code which, when executed on a computer system, causes the computer system to perform the steps of any of Examples 18-25.

In some implementations, for example, the activation of panels (e.g., one or more panels) at a UE may be triggered by the gNB or the UE and may use any combination of the approaches as described above in detail in reference to FIGS. 2-7.

Figure 8:
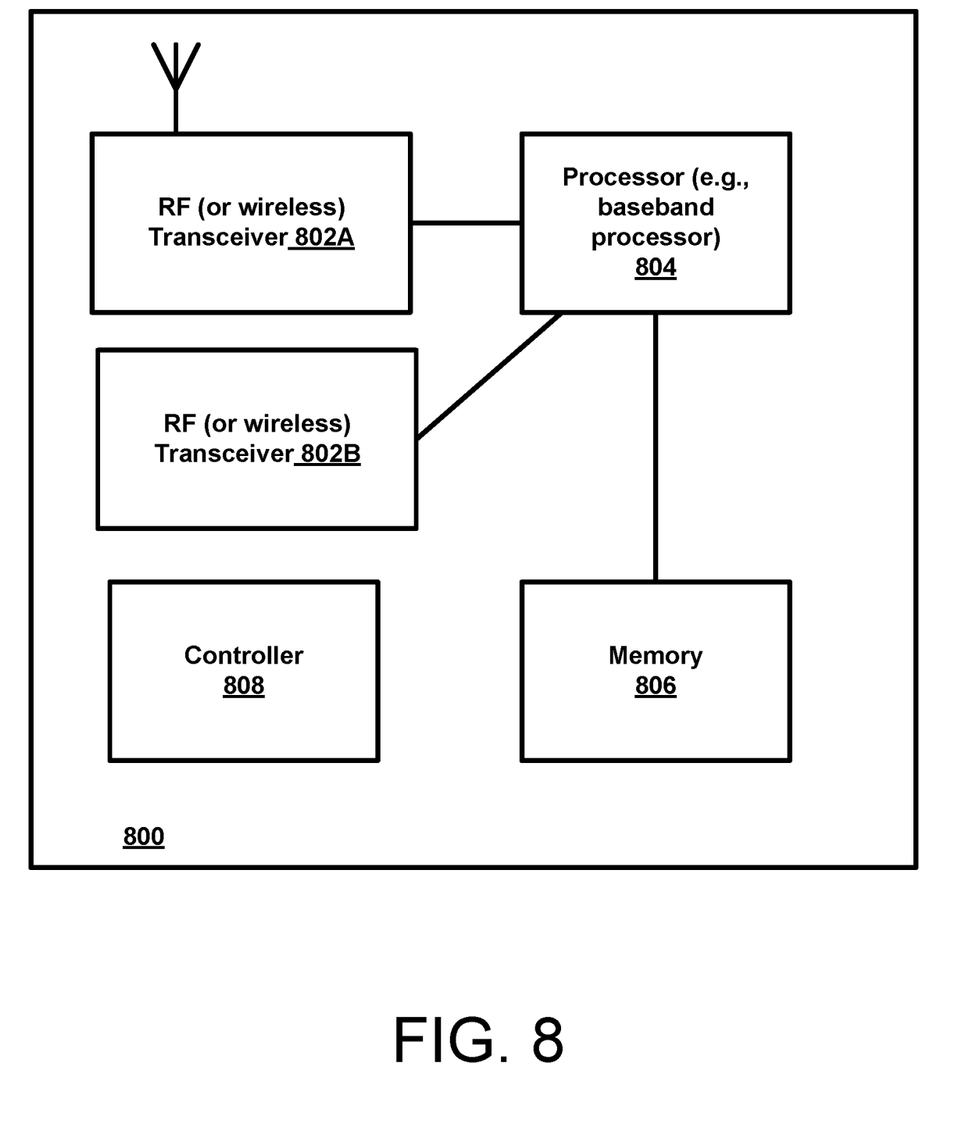
FIG. 8 is a block diagram of a node or wireless station (e.g., base station/access point or mobile station/user device/UE), according to an example implementation.

FIG. 8 is a block diagram 800 of a wireless station, for example, AP/gNB/eNB/MgNB/SgNB/NG-RAN node or user equipment (UE)/user device) according to an example implementation. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/808 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:
    transmitting, by a network node, a synchronization signal block (SSB) to a user equipment (UE), the synchronization signal block (SSB) comprising a plurality of beams;
    transmitting, by the network node, a panel activation request to the user equipment (UE); and
    receiving, by the network node, in response to the transmitting of the synchronization signal block (SSB) and the panel activation request:
        a first transmission of a physical random access channel (PRACH) using a first physical random access channel (PRACH) resource of a first set of physical random access channel (PRACH) resources, the first set of physical random access channel (PRACH) resources configured for the plurality of the beams associated with the SSB,
        a second transmission of the physical random access channel (PRACH) using a second physical random access channel (PRACH) resource of a second set of physical random access channel (PRACH) resources, the second transmission comprising a panel activation message and the second set of physical random access channel (PRACH) resources configured for indicating one or more panels activated at the user equipment (UE), and
        wherein the first transmission and the second transmission are received using a same receive (Rx) beam at the network node, the second transmission directly following the first transmission on the receive (Rx) beam, the first transmission and the second transmission being received without a transmitting of a signal to the user equipment (UE) in between the receiving of the first transmission and the receiving of the second transmission.

2. The method of claim 1, wherein the panel activation request indicates identities of the one or more panels to be activated at the user equipment (UE).

3. The method of claim 2, wherein the panel activation request is transmitted via a physical downlink control channel (PDCCH), a radio resource control (RRC) configuration message, or a channel state information-reference signal (CSI-RS).

4. The method of claim 1, wherein the network node is a radio access network node, an integrated access and backhaul (IAB) network node, and/or the user equipment (UE) is an integrated access and backhaul (IAB) node.

5. An apparatus comprising at least one processor and at least one memory including computer instructions, when executed by the at least one processor, cause the apparatus to perform the method of claim 1.

6. A non-transitory computer-readable storage medium having stored thereon computer executable program code which, when executed on a computer system, causes the computer system to perform the steps of claim 1.

7. A method of communications, comprising:
    receiving, by a user equipment (UE), a synchronization signal block (SSB) from a network node, the synchronization signal block (SSB) comprising a plurality of beams;
    receiving, by the user equipment (UE), a panel activation request from the network node;
    measuring, by the user equipment (UE), the plurality of beams received from the network node;
    activating, by the user equipment (UE), one or more panels, the activating based at least on the panel activation request and/or the measuring; and
    transmitting, by the user equipment (UE):
        a first transmission of a physical random access channel (PRACH) using a first physical random access channel (PRACH) resource of a first set of physical random access channel (PRACH) resources configured for the plurality of the beams associated with the SSB,
        a second transmission of the physical random access channel (PRACH) using a second physical random access channel (PRACH) resource of a second set of physical random access channel (PRACH) resources configured for indicating the activating of one or more panels at the user equipment (UE), and
        wherein the first transmission and the second transmission are transmitted using a same transmit (Tx) beam from the user equipment (UE), the second transmission directly following the first transmission on the transmit (Tx) beam, the first transmission and the second transmission being transmitted without a receiving of a signal in between the transmitting of the first transmission and the transmitting of the second transmission.

8. The method of claim 7, wherein the panel activation request indicates identities of the one or more panels to be activated at the user equipment (UE).

9. The method of claim 7, wherein at least one panel is used by the user equipment (UE) for performing the measuring.

10. The method of claim 9, wherein the at least one panel that is used by the user equipment (UE) for performing the measuring is in a reception only state.

11. The method of claim 9, wherein the at least one panel that is used by the user equipment (UE) for performing the measuring is in a deactivated state and transitioned to the reception only state for performing the measuring.

12. The method of claim 7, wherein the panel activation request is received via a physical downlink control channel (PDCCH), a radio resource control (RRC) configuration message, or a channel state information-reference signal (CSI-RS).

13. The method of claim 7, wherein the network node is a radio access network node or an integrated access and backhaul (IAB) network node.

14. An apparatus comprising at least one processor and at least one memory including computer instructions, when executed by the at least one processor, cause the apparatus to perform the method of claim 7.

15. A non-transitory computer-readable storage medium having stored thereon computer executable program code which, when executed on a computer system, causes the computer system to perform the steps of claim 7.

16. A method of communications, comprising:
  receiving, by a user equipment (UE), a synchronization signal block (SSB) from a network node, the synchronization signal block (SSB) comprising a plurality of beams;
  measuring, by the user equipment (UE), the plurality of beams received from the network node;
  receiving, by the user equipment (UE), configuration information from the network node, the configuration information based on SSB configuration and a number of panels at the user equipment (UE), the configuration information further comprising:
    a first transmission configuration indicating a first set of physical random access channel (PRACH) resources configured for the plurality of beams received from the network node, and
    a second transmission configuration indicating a second set of physical random access channel (PRACH) resources for one or more panels active at the user equipment (UE); and
  transmitting, by the user equipment (UE):
    a first transmission of a physical random access channel (PRACH) to the network node, the first transmission using resources based on the first transmission configuration, and
    a second transmission of the physical random access channel (PRACH) to the network node, the second transmission using resources based on the second transmission configuration, wherein the first transmission and the second transmission are transmitted using a same transmit (Tx) beam from the user equipment (UE), the second transmission directly following the first transmission on the transmit (Tx) beam, the first transmission and the second transmission being transmitted without a receiving of a signal in between the transmitting of the first transmission and the transmitting of the second transmission.

17. The method of claim 16, wherein the transmitting of the second transmission of the physical random access channel (PRACH) further comprises:
  determining whether a panel of the plurality of panels is being activated; and
  configuring, in response to determining that the panel is being activated, a resource from the second set of physical random access channel (PRACH) resources based on the second transmission configuration.

18. The method of claim 16, wherein a panel at the user equipment (UE) is in one of a deactivated mode, a reception only mode, or an activated mode.

19. The method of claim 16, wherein panel transitions include at least transitioning of a panel from the deactivated mode to the reception only mode and/or from the reception only mode to the activated mode.

20. The method of claim 16, wherein a panel is activated by the user equipment (UE) based on downlink signal quality measurements.

21. The method of claim 16, wherein the measuring of the plurality of beams is performed by one or more panels at the user equipment (UE) in the reception only mode.

22. The method of claim 16, wherein the user equipment (UE) is an integrated access and backhaul (TAB) node.

23. An apparatus comprising at least one processor and at least one memory including computer instructions, when executed by the at least one processor, cause the apparatus to perform the method of claim 16.

24. A non-transitory computer-readable storage medium having stored thereon computer executable program code which, when executed on a computer system, causes the computer system to perform the steps of claim 16.

* * * * *